(12) United States Patent
Kanno

(10) Patent No.: US 7,998,628 B2
(45) Date of Patent: Aug. 16, 2011

(54) FUEL CELL SYSTEM AND CONTROL METHOD FOR AN OPEN/CLOSE MECHANISM THEREOF

(75) Inventor: Yoshihito Kanno, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1337 days.

(21) Appl. No.: 11/578,774

(22) PCT Filed: May 12, 2005

(86) PCT No.: PCT/IB2005/001303
§ 371 (c)(1),
(2), (4) Date: Oct. 18, 2006

(87) PCT Pub. No.: WO2005/112167
PCT Pub. Date: Nov. 24, 2005

(65) Prior Publication Data
US 2007/0231644 A1    Oct. 4, 2007

(30) Foreign Application Priority Data

May 14, 2004  (JP) ................................ 2004-144404
Jan. 11, 2005  (JP) ................................ 2005-003601

(51) Int. Cl.
*H01M 8/04* (2006.01)
*H01M 8/00* (2006.01)

(52) U.S. Cl. ........ 429/412; 429/427; 429/428; 429/448; 429/449; 429/505

(58) Field of Classification Search .................. 429/412, 429/427, 428, 448, 449, 505
See application file for complete search history.

(56) References Cited

U.S. PATENT DOCUMENTS 6,171,718 B1    1/2001  Murach et al.
6,426,158 B1 *  7/2002  Pratt et al. ..................... 429/408
(Continued)

FOREIGN PATENT DOCUMENTS

CA    2 293 898 A1    7/2000
(Continued)

OTHER PUBLICATIONS

Oct. 20, 2010 Office Action issued in German Patent Application No. 11 2008 000 528.1-45 (with translation).

*Primary Examiner* — Ula C Ruddock
*Assistant Examiner* — Amanda Barrow
(74) *Attorney, Agent, or Firm* — Oliff & Berridge, PLC

(57) ABSTRACT

In a fuel cell system (10), an anode exhaust gas discharge pipe (50) is full of hydrogen at the start of operation of a fuel cell (20). As time passes when the fuel cell (20) is operating, the concentration of impurities within the anode exhaust gas discharge pipe (50) increases. When the hydrogen concentration is less than a reference concentration for opening a valve, an upstream cut-off valve (61) closes and a downstream cut off valve (62) opens. As a result, the impurity concentration in the anode gas discharge pipe (50) quickly drops and is restored to the level that it was at the start of operation of the fuel cell (20). This sudden drop in the impurity concentration is caused by a pressure difference between the pressure in the anode exhaust gas pipe (50) and the pressure of the outside air, and the concentration gradient.

13 Claims, 7 Drawing Sheets

U.S. PATENT DOCUMENTS

| | | | |
|---|---|---|---|
| 6,436,562 B1 * | 8/2002 | DuBose | 429/408 |
| 6,558,827 B1 * | 5/2003 | Reiser | 429/415 |
| 7,718,286 B2 * | 5/2010 | Fujita | 429/444 |
| 2001/0049035 A1 * | 12/2001 | Haltiner et al. | 429/13 |
| 2003/0049503 A1 | 3/2003 | Ballantine et al. | |
| 2003/0157383 A1 * | 8/2003 | Takahashi | 429/22 |
| 2004/0096721 A1 * | 5/2004 | Ohlsen et al. | 429/34 |
| 2005/0214617 A1 * | 9/2005 | Chapman et al. | 429/34 |
| 2006/0240309 A1 | 10/2006 | Dehne | |
| 2007/0009772 A1 * | 1/2007 | Iio | 429/13 |

FOREIGN PATENT DOCUMENTS

| | | | |
|---|---|---|---|
| DE | 2 146 933 A1 | | 3/1973 |
| EP | 1018774 | * | 12/1999 |
| EP | 1 018 774 A1 | | 7/2000 |
| JP | A 9-312167 | | 12/1997 |
| JP | A 2003-77506 | | 3/2003 |
| WO | WO 03/010841 A2 | | 2/2003 |
| WO | PCT/IB2004/003365 | * | 10/2004 |

* cited by examiner

FUEL CELL SYSTEM AND CONTROL METHOD FOR AN OPEN/CLOSE MECHANISM THEREOF

FIELD OF THE INVENTION

The invention relates to a fuel cell system that includes a single cell fuel cell or a fuel cell in which a plurality of single cells are stacked together, and a control method for an open/close mechanism of that fuel cell system.

BACKGROUND OF THE INVENTION

In a fuel cell that operates without discharging fuel gas that is in the fuel cell (such as the fuel cell disclosed in JP(A) 9-312167, for example), the electrode catalyst becomes covered with impurities such as nitrogen and moisture that accumulate in the fuel cell as time passes when the fuel cell is operating. As a result, electromotive reaction in the electrode catalyst is impaired, resulting in a decrease in output voltage.

To combat this problem, in a fuel cell of related art that operates without discharging fuel gas that is in the fuel cell, when the output voltage becomes equal to, or less than, a predetermined reference voltage, anode exhaust gas containing impurities (on the anode side) in the fuel cell is discharged outside the fuel cell in an attempt to recover the output voltage.

In the fuel cell of the related art that operates without discharging fuel gas that is in the fuel cell, however, there is almost no flow or diffusion of fuel gas particularly at the ends of each cell in the fuel cell stack so impurities tend to accumulate there, making it difficult to generate sufficient power. As a result, the output voltage of the fuel cell frequently drops so unless the impurities that accumulate in the fuel cell are discharged more frequently, the necessary output voltage is unable to be obtained. In this case, because fuel gas in the fuel cell is also discharged when the impurities are discharged, the fuel efficiency performance of the fuel cell decreases.

DISCLOSURE OF THE INVENTION

The invention thus aims to suppress a decrease in fuel cell performance and improve fuel efficiency performance of the fuel cell in a fuel cell that operates without discharging anode exhaust gas that is in the fuel cell.

A fuel cell system according to a first aspect of the invention is provided with a fuel cell having an anode exhaust gas outlet through which anode exhaust gas is discharged; an anode exhaust gas discharge pipe which is connected to the anode exhaust gas outlet of the fuel cell; a plurality of open/close mechanisms arranged in the anode exhaust gas discharge pipe, which can be switched between open (i.e., in a state that allows flow through the discharge pipe) and closed (i.e., in a state that obstructs flow through the discharge pipe); and a control portion which closes a downstream-most open/close mechanism that is disposed farthest downstream, from among the plurality of open/close mechanisms, during normal operation of the fuel cell, and closes at least one open/close mechanism other than the downstream-most open/close mechanism, from among the plurality of open/close mechanisms, when the downstream-most open/close mechanism is open.

Because the fuel cell system is provided with the plurality of open/close mechanisms and the control portion, it is possible to reduce the amount of hydrogen discharged from the fuel cell. Accordingly, a decrease in fuel cell performance can be suppressed and the fuel efficiency performance of the fuel cell can be improved in a fuel cell which operates without discharging the anode exhaust gas that is in the fuel cell.

The fuel cell system may further include a concentration detector which detects an impurity concentration in the anode exhaust gas discharge pipe upstream of the downstream-most open/close mechanism, and be such that the control portion opens the downstream-most open/close mechanism, even if the fuel cell is operating normally, when the impurity concentration detected by the concentration detector is higher than a first predetermined concentration. According to this structure, impurities in the anode exhaust gas that have accumulated in the anode exhaust gas discharge pipe can be discharged outside of the fuel cell, which facilitates movement of impurities in the anode exhaust gas that accumulate at the end portion of the fuel cell to the anode exhaust gas discharge pipe. Further, the amount of hydrogen discharged from the fuel cell can be reduced because the downstream-most open/close mechanism is opened only when the concentration of impurities in the anode exhaust gas discharge pipe is higher than the first predetermined concentration.

The concentration detector may also detect the impurity concentration between the downstream-most open/close mechanism and an open/close mechanism that is closed when the downstream-most open/close mechanism is open.

The control portion may also close the downstream-most open/close mechanism when the impurity concentration that has become higher than the first predetermined concentration becomes lower than a second predetermined concentration which is lower than the first predetermined concentration. This structure makes it possible to determine the timing for closing the downstream-most open/close mechanism according to the impurity concentration. It also makes it possible to make a determination with respect to switching the downstream-most open/close mechanism between open and closed using the detection results from the concentration detector.

The control portion may also close the downstream-most open/close mechanism and open at least one open/close mechanism other than the downstream-most open/close mechanism, from among the plurality of open/close mechanisms, when the downstream-most open/close mechanism is to be closed, based on the fact that the impurity concentration that has become higher than the first predetermined concentration has become lower than the second predetermined concentration. This structure makes it possible to reduce the amount of hydrogen discharged from the anode exhaust gas discharge pipe.

The concentration detector may also detect a hydrogen concentration in the anode exhaust gas discharge pipe upstream of the downstream-most open/close mechanism, and detect the impurity concentration from the detected hydrogen concentration.

The concentration detector may also detect an output voltage of the fuel cell, and detect the impurity concentration from the detected output voltage.

The fuel cell system may further include flow rate detecting means for detecting a flow rate of anode exhaust gas flowing through the anode exhaust gas discharge pipe downstream of the downstream-most open/close mechanism, and be such that the control portion closes the downstream-most open/close mechanism when the detected anode exhaust gas flow rate is less than a predetermined flow rate when the downstream-most open/close mechanism is open. This structure makes it possible to determine the timing for closing the downstream-most open/close mechanism based on the flow rate of the anode exhaust gas in the anode exhaust gas discharge pipe. Also, because the flow rate detecting means is used together with the concentration detector, even if one of the concentration detector and the flow rate detecting means fails, it is possible to determine when to close the downstream-most open/close mechanism using the other one.

The flow rate detecting means may include a first pressure detector which is provided in the anode exhaust gas discharge pipe upstream of the downstream-most open/close mechanism and detects a pressure of the anode exhaust gas, and a second pressure detector which is provided in the anode exhaust gas discharge pipe downstream of the downstream-most open/close mechanism and detects the pressure of the anode exhaust gas. Further, when a pressure difference between the pressure of the anode exhaust gas detected by the first pressure detector and the pressure of the anode exhaust gas detected by the second pressure detector is equal to, or less than, a predetermined pressure when the detected impurity concentration is higher than the first predetermined concentration and the downstream-most open/close mechanism is open, the control portion may determine that the detected anode exhaust gas flow rate is less than a predetermined flow rate and close the downstream-most open/close mechanism.

When the pressure difference is less than a predetermined value, the control portion may determine that the detected anode exhaust gas flow rate is less than the predetermined flow rate and close the downstream-most open/close mechanism.

The control portion may open at least one open/close mechanism other than the downstream-most open/close mechanism, from among the plurality of open/close mechanisms, when the downstream-most open/close mechanism is closed, based on the fact that the detected anode exhaust gas flow rate has become less than the predetermined flow rate.

The plurality of open/close mechanisms may be two open/close mechanisms, one being the downstream-most open/close mechanism and one being an upstream open/close mechanism that is disposed upstream of the downstream-most open/close mechanism. This structure enables a decrease in fuel cell performance to be suppressed and the fuel efficiency performance to be improved with a simple structure.

The plurality of open/close mechanisms may be valves.

The fuel cell system may further include a fuel gas supply portion that supplies fuel gas at a constant pressure to the fuel cell. This structure enables a predetermined amount of fuel gas to constantly be supplied to the fuel cell.

A second aspect of the invention relates to a control method for an open/close mechanism in a fuel cell system which is provided with a plurality of open/close mechanisms that are disposed in an anode exhaust gas discharge pipe connected to a fuel cell and that can be switched between open and closed, and in which a downstream-most open/close mechanism that is disposed farthest downstream, from among the plurality of open/close mechanisms, is closed during normal operation of the fuel cell. The control method includes the steps of detecting an impurity concentration in the anode exhaust gas discharge pipe upstream of the downstream-most open/close mechanism; and closing at least one open/close mechanism other than the downstream-most open/close mechanism, from among the plurality of open/close mechanisms, and opening the downstream-most open/close mechanism when the detected impurity concentration is higher than a first predetermined concentration.

According to this control method, the same operational effects can be obtained that are obtained with the fuel cell system according to the first aspect of the invention. In addition, the control method according to the second aspect of the invention can be realized by various modes just like the fuel cell system according to the first aspect of the invention. Also, the control method for an open/close mechanism in the fuel cell system according to the second aspect of the invention can be realized as a program executed by a computer, or by a recording medium that can be read by a computer, on which that program is stored.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

In the following description, exemplary embodiments of a fuel cell system according to the invention will be described with reference to the appended drawings.

Figure 1:
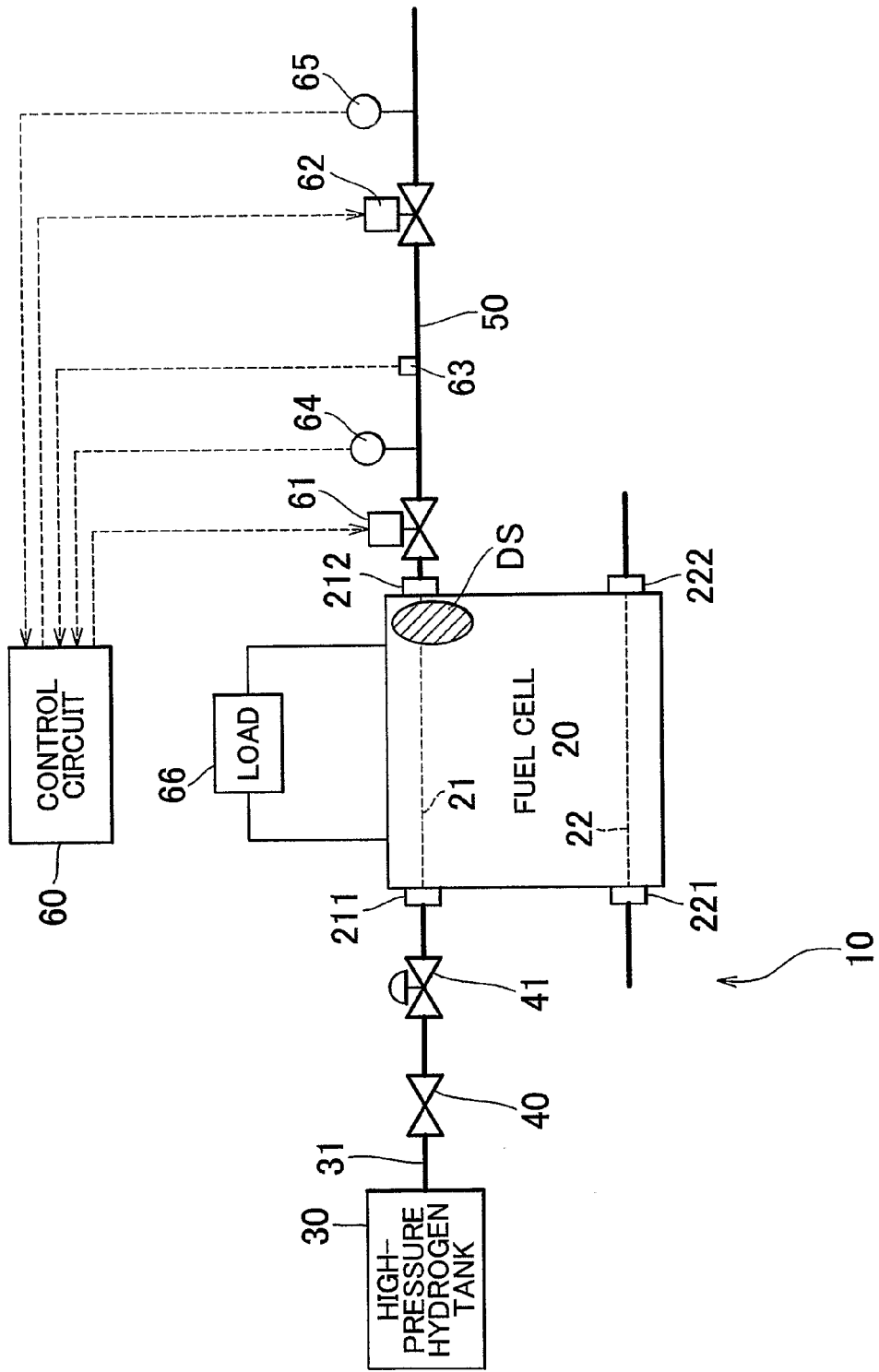
FIG. 1 is a representational view illustrating one example of a structure of a fuel cell system according to an exemplary embodiment of the invention.

The schematic structure of a fuel cell system according to one exemplary embodiment will now be described with reference to FIG. 1. FIG. 1 is a representational view of one example of the structure of the fuel cell system according to the exemplary embodiment.

Referring to FIG. 1, a fuel cell system 10 includes a fuel cell 20, a high-pressure hydrogen tank 30, a high-pressure hydrogen tank cut-off valve 40, an anode exhaust gas discharge pipe (hereinafter, simply referred to as "discharge pipe") 50, a control circuit 60, an upstream cut-off valve 61, and a downstream cut-off valve 62.

The fuel cell 20 is, for example, a fuel cell stack in which a plurality of single cells are stacked together. Each single cell includes a membrane electrode assembly, and an anode separator and a cathode separator which sandwich the membrane electrode assembly. The membrane electrode assembly includes, for example, a polymer electrolyte membrane, and a catalyst layer and a diffusion layer (i.e., electrode) formed on both sides of the polymer electrolyte membrane. Power generated by the fuel cell 20 is then supplied to a load 66 such as an electric motor.

The fuel cell 20 is provided with a fuel gas flow path 21 (i.e., fuel gas manifold) for supplying a fuel gas to each single cell, and an oxidizing gas flow path 22 (i.e., oxidizing gas manifold) for supplying oxidizing gas to each single cell. The fuel gas supplied to the fuel gas flow path 21 is supplied to an in-cell fuel gas flow path, not shown, formed in each single cell. At the upstream end of the fuel gas flow path 21 there is a fuel gas intake portion 211 for introducing the fuel gas supplied from the high-pressure hydrogen tank 30 into the fuel gas flow path 21. At the downstream end of the fuel gas flow path 21 there is a fuel gas discharge portion 212 for discharging fuel gas that flows through the fuel gas flow path 21 outside the fuel cell 20. At the upstream end of the oxidizing gas flow path 22 there is an oxidizing gas intake portion 221 for introducing oxidizing gas into the oxidizing gas flow path 22. At the downstream end of the oxidizing gas flow path 22 there is an oxidizing gas discharge portion 222 for discharging oxidizing gas that flows through the oxidizing gas flow path 22 outside the fuel cell 20.

The high-pressure hydrogen tank 30 stores hydrogen as the fuel gas. A fuel gas supply line 31 provides communication between the high-pressure hydrogen tank 30 and the fuel gas intake portion 211 of the fuel cell 20. In this exemplary embodiment, the fuel gas supply source is the high-pressure hydrogen tank 30. Alternatively, however, the fuel gas supply source may be a hydrogen tank that uses a hydrogen-absorbing alloy, a hydrogen rich gas storage vessel that stores hydrogen rich gas, or a hydrogen rich gas generator that produces hydrogen rich gas.

A high-pressure hydrogen tank cut-off valve 40 and a hydrogen pressure regulating valve 41 are disposed in the fuel gas supply line 31. The high-pressure hydrogen tank cut-off valve 40 opens and closes communication between the high-pressure hydrogen tank 30 and the fuel gas supply line 31. The hydrogen pressure regulating valve 41 reduces the pressure (high pressure) of the fuel gas so that the pressure difference between the pressure upstream of the hydrogen pressure regulating valve 41 and the pressure downstream of the hydrogen pressure regulating valve 41 becomes a predetermined pressure difference, and then supplies the fuel gas to the fuel cell 20 at the reduced pressure. That is, in this exemplary embodiment, the flow rate of the fuel gas supplied to the fuel cell 20 is controlled according to the amount of fuel gas consumed in the fuel cell 20, so that the pressure of the fuel gas supplied to the fuel cell 20 becomes constant.

The fuel gas discharge portion 212 of the fuel cell 20 is connected to the discharge pipe 50. In the fuel cell system 10 according to this exemplary embodiment, impurities IM in the fuel cell 20 do not accumulate at the end (the downstream region) DS of the fuel cell 20, but rather in the discharge pipe 50. More specifically, the impurities IM produced in the fuel cell 20 (i.e., in the fuel gas flow path 21) are carried to the end region DS of the fuel gas flow path 21 by the exhaust gas flowing through the fuel gas flow path 21 of the fuel cell 20. The impurities IM that have reached the end region DS of the fuel gas flow path 21 of the fuel cell 20 are then prevented from both moving upstream in the fuel cell 20 and diffusing due to concentration difference between the fuel gas flow path 21 and the end region DS due to the exhaust gas flowing through the fuel gas flow path 21 to the end region DS, so they successively move toward the discharge pipe 50 as they diffuse between the discharge pipe 50 and the end region DS.

An upstream cut-off valve 61 is disposed upstream in the discharge pipe 50 (i.e., at the end of the discharge pipe 50 that connects with the fuel cell 20), and a downstream cut-off valve 62 is disposed downstream in the discharge pipe 50. The upstream cut-off valve 61 switches between opening and closing communication between the fuel cell 20 and the discharge pipe 50 in response to a control signal from the control circuit 60. The downstream cut-off valve 62 switches between opening and closing communication between the discharge pipe 50 and the outside air in response to a control signal from the control circuit 60.

A hydrogen concentration sensor 63 is provided between the upstream cut-off valve 61 and the downstream cut-off valve 62 in the discharge pipe 50 to detect the impurity concentration in the discharge pipe 50. The impurity concentration (nitrogen concentration) in the discharge pipe 50 can be detected relatively by detecting the hydrogen concentration in the discharge pipe 50 using the hydrogen concentration sensor 63. That is, when the fuel cell 20 first starts to operate, the hydrogen concentration in the discharge pipe 50 detected by the hydrogen concentration sensor 63 is high but then decreases (i.e., the impurity concentration increases) as impurities IM move from the cathode and accumulate.

A first pressure sensor 64 is also disposed between the upstream cut-off valve 61 and the downstream cut-off valve 62 in the discharge pipe 50. This first pressure sensor 64 detects the pressure in the discharge pipe 50 between the upstream cut-off valve 61 and the downstream cut-off valve 62. Further, a second pressure sensor 65 is disposed downstream of the downstream cut-off valve 62 in the discharge pipe 50. This second pressure sensor 65 detects the pressure in the discharge pipe 50 downstream of the downstream cut-off valve 62.

The fuel cell 20 according to this exemplary embodiment functions as an anode exhaust gas non-recirculating fuel cell which operates without recirculating anode exhaust gas to the fuel cell 20 by opening the upstream cut-off valve 61 and closing the downstream cut-off valve 62. In the fuel cell 20 according to this exemplary embodiment, anode exhaust gas discharged from the fuel gas discharge portion 212 is not re-injected into the fuel gas intake portion 211. Also, opening the downstream cut-off valve 62 enables the impurities IM that have accumulated in the discharge pipe 50 (the fuel cell 20) to be discharged together with the anode exhaust gas outside the fuel cell system 10. The anode exhaust gas refers to fuel gas which includes impurities IM such as moisture and nitrogen and which is used in the electromotive reaction. The end region (or downstream region) DS in the fuel cell 20 refers to a region near the fuel gas discharge portion 212 in the fuel cell 20 where impurities IM accumulate.

The control circuit 60 serves as controlling means for controlling operation of the fuel cell system 10 and includes a central processing unit (CPU), read only memory (ROM), and random access memory (RAM) and the like. The control circuit 60 is connected to the upstream cut-off valve 61, the downstream cut-off valve 62, the hydrogen concentration sensor 63, and the first and second pressure sensors 64 and 65 via signal lines.

Operation of the fuel cell system 10 according to this exemplary embodiment will now briefly be described. Fuel gas is supplied from the high-pressure hydrogen tank 30 to the fuel gas intake portion 211 of the fuel cell 20 at a predetermined pressure. Therefore, when fuel gas is consumed in the fuel cell 20 following electromotive reaction and the pressure in the fuel gas flow path 21 of the fuel cell 20 (which may be determined by the pressure in the fuel gas supply line 30) falls below a predetermined pressure, new fuel gas is supplied until the pressure in the fuel cell 20 reaches the predetermined pressure, by operating the hydrogen pressure regulating valve 41. In other words, new fuel gas of an amount corresponding to the amount consumed by the fuel cell 20 is supplied from the high-pressure hydrogen tank 30 to the fuel gas intake portion 211 of the fuel cell 20. In actuality, however, impurities including water and nitrogen permeate the polymer electrolyte membrane from the oxidizing gas flow path 22 to the fuel gas flow path 21 in the fuel cell 20, so the amount of fuel gas supplied from the high-pressure hydrogen tank 30 to the fuel gas intake portion 21 of the fuel cell 20 is actually less than the amount consumed by the fuel cell 20.

Impurities IM including water and nitrogen permeate the polymer electrolyte membrane by diffusing due to concentration difference from the oxidizing gas flow path 22 to the fuel gas flow path 21 in the fuel cell 20. Impurities IM that have passed through to the fuel gas flow path 21 in the fuel cell 20 are then carried toward the downstream region DS of the fuel gas flow path 21 by fuel gas as it is supplied. During normal operation of the fuel cell 20, the upstream cut-off valve 61 is open and the downstream cut-off valve 62 is closed. Therefore, impurities IM that have been carried to the downstream region DS of the fuel gas flow path 21 accumulate in the discharge pipe 50 upstream of the downstream cut-off valve 62 through diffusion due to concentration difference. Impurities IM that have accumulated in the discharge pipe 50 upstream of the downstream cut-off valve 62 are discharged out of the discharge pipe 50, i.e., out of the fuel cell system 10, by the following procedure.

Figure 2:
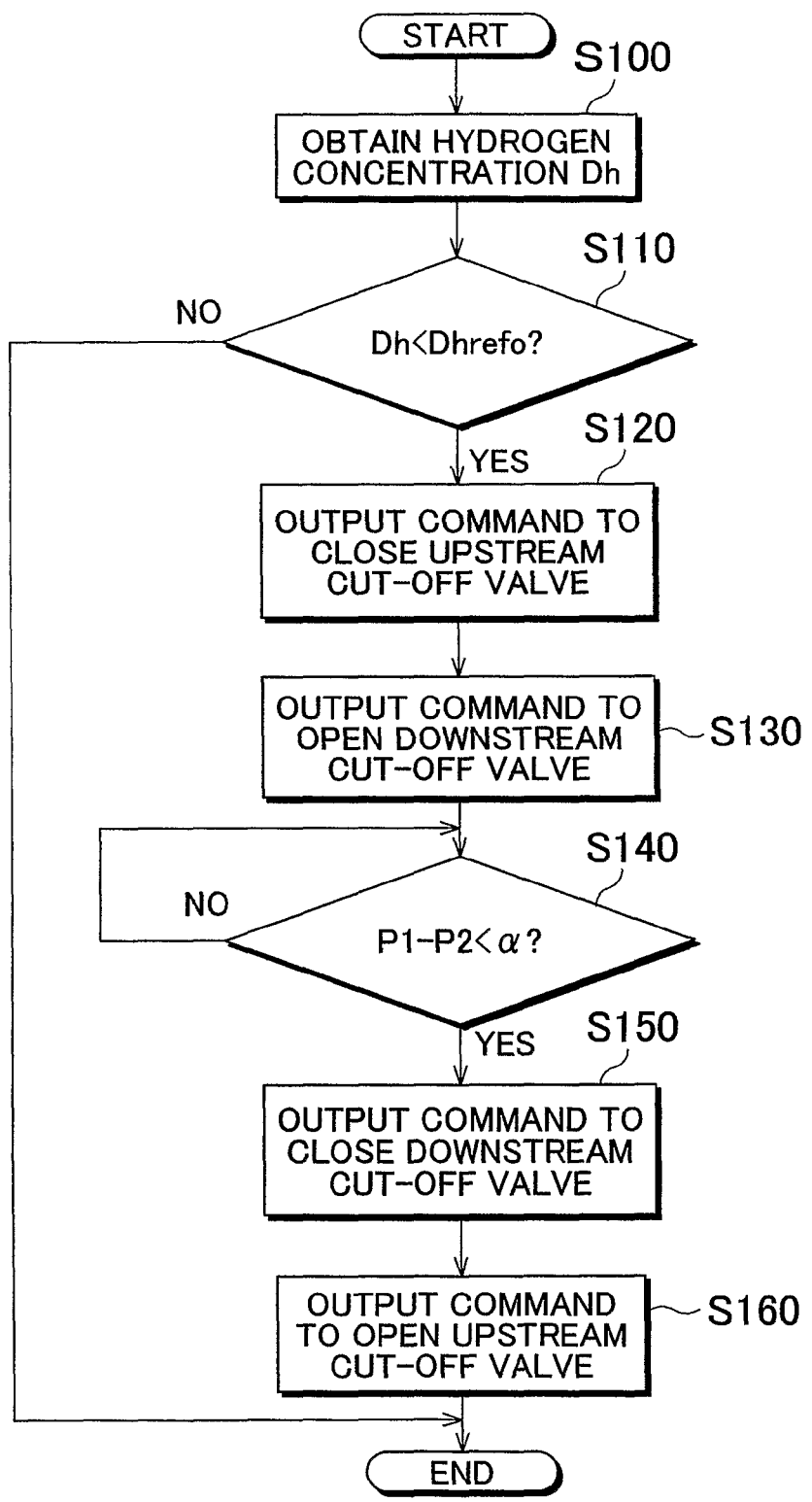
FIG. 2 is a flowchart of a routine for an anode exhaust gas discharge process in the fuel cell according to the exemplary embodiment.
Figure 3:
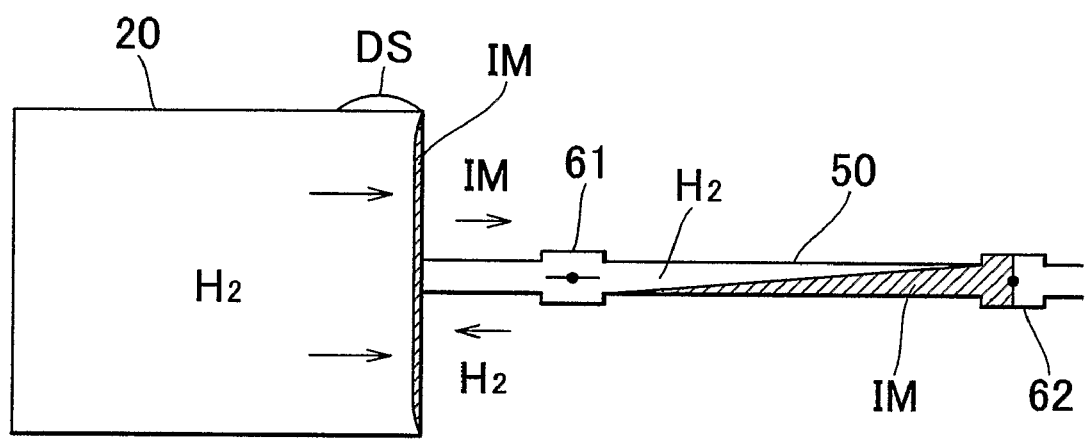
FIG. 3 is a representational view showing one state of accumulation and discharge of impurities in the fuel cell system according to the exemplary embodiment.
Figure 4:
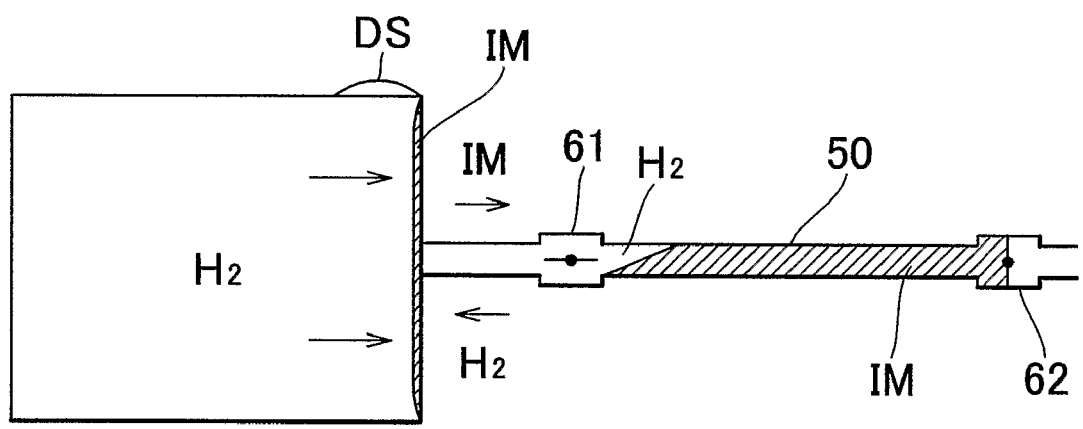
FIG. 4 is a representational view showing another state of accumulation and discharge of impurities in the fuel cell system according to the exemplary embodiment.
Figure 5:
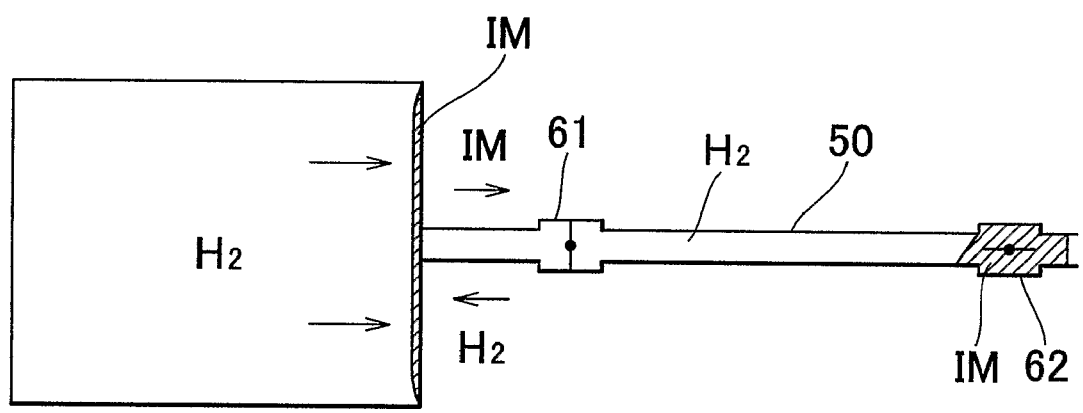
FIG. 5 is a representational view showing yet another state of accumulation and discharge of impurities in the fuel cell system according to the exemplary embodiment.
Figure 6:
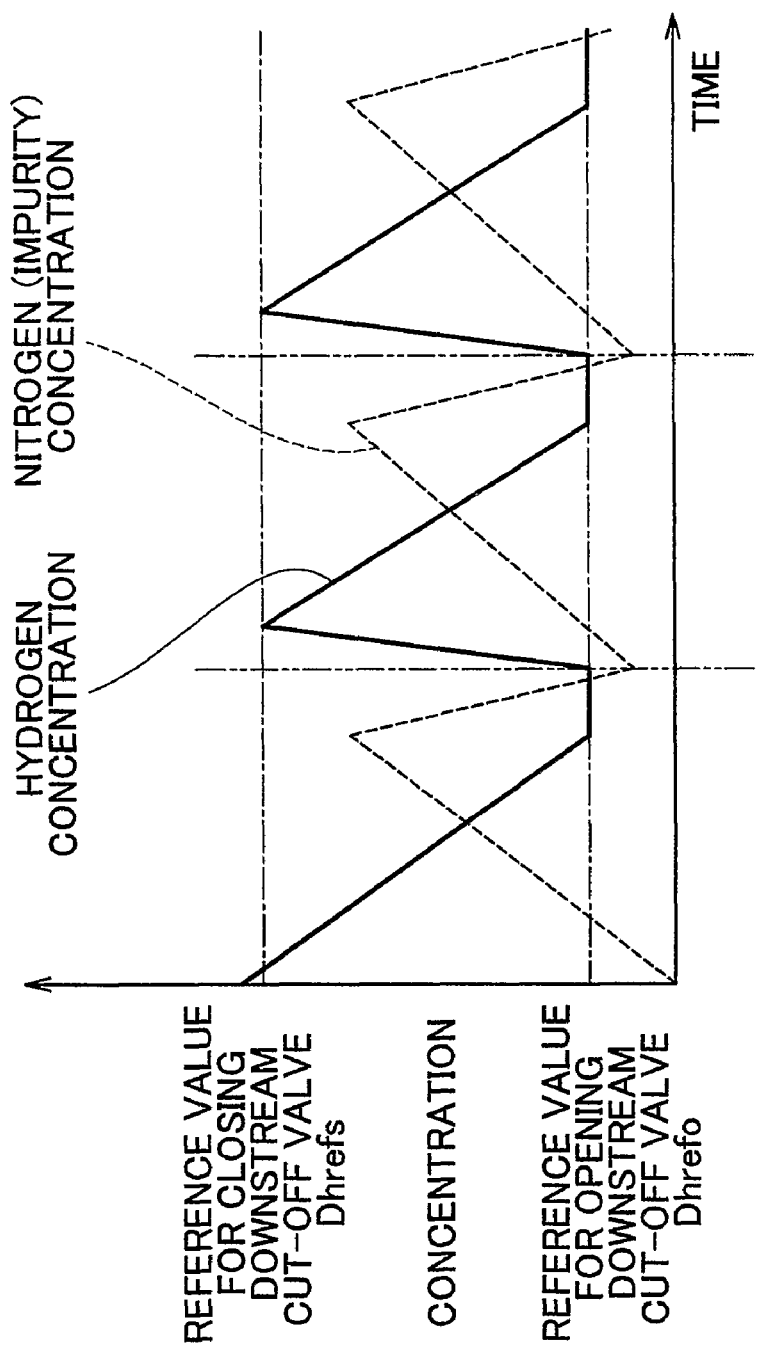
FIG. 6 is a representational view showing the change over time in the hydrogen concentration and the impurity concentration in an anode exhaust gas discharge pipe in the exemplary embodiment.

The operation of the fuel cell system 10 according to this exemplary embodiment to discharge impurities IM will now be described with reference to FIGS. 2 to 6. FIG. 2 is a flowchart of a routine for an anode exhaust gas discharge process in the fuel cell 20 according to this exemplary embodiment. FIGS. 3 to 5 are representational views of various states of accumulation/discharge of impurities IM in the fuel cell system 10 according to this exemplary embodiment. FIG. 6 is a representational view illustrating the change over time in hydrogen concentration and impurity concentration in the anode exhaust gas discharge pipe according to this exemplary embodiment.

The control circuit 60 repeatedly executes the routine shown in FIG. 2 at predetermined intervals of time. The control circuit 60 starts operation of the fuel cell 20 by opening the upstream cut-off valve 61 and closing the downstream cut-off valve 62. When the control circuit 60 starts the routine, it first obtains a hydrogen concentration Dh in the discharge pipe 50 upstream of the downstream cut-off valve 62 via the hydrogen concentration sensor 63 (i.e., step S100). The control circuit 60 then determines whether the hydrogen concentration Dh is less than a reference concentration Dhrefo for opening the downstream cut-off valve 62 (i.e., step S110). If the hydrogen concentration Dh is not less than that reference concentration Dhrefo (i.e., No in step S110), this cycle of the routine ends. If the hydrogen concentration Dh is equal to, or greater than, the reference concentration Dhrefo, then the inside of the discharge pipe 50 is in a state such as that shown in FIG. 3, for example. That is, the discharge pipe 50 is not completely filled with impurities IM so there is still room for more impurities to accumulate. At the end region DS as well, hydrogen is consumed and impurities IM again come from the cathode. As a result, the impurity concentration at the end region DS increases. In addition, in order to replace the hydrogen consumed at the end region DS, hydrogen inside the discharge pipe 50 moves to the end region DS, as shown in FIG. 3. This causes the impurities to diffuse due to concentration difference between the end region DS and the discharge pipe 50 and move from the end region DS toward the discharge pipe 50.

If, on the other hand, the control circuit 60 has determined that the hydrogen concentration Dh is less than the reference concentration Dhrefo (i.e., Yes in step S110), it sends out both a command to close the upstream cut-off valve 61 (i.e., step S120) and a command to open the downstream cut-off valve 62 (i.e., step S130). The downstream cut-off valve 62 may be opened either at the same time that the upstream cut-off valve 61 is closed, or after the upstream cut-off valve 61 is completely closed.

When the determination in step S110 is Yes, the inside of the discharge pipe 50 is in a state such as that shown in FIG. 4, for example. That is, the discharge pipe 50 is almost completely filled with impurities IM so no more impurities can accumulate. In this state, there is no hope that the impurities IM will diffuse due to concentration difference and move from the downstream region DS of the fuel cell 20 to the discharge pipe 50. As a result, the power generating performance of the fuel cell 20 may decline.

After step S130, the control circuit 60 waits until the pressure difference between pressures P1 and P2 detected by the first and second pressure sensors 64 and 65, respectively, i.e., the pressure difference (P1−P2) between the pressure in the discharge pipe 50 between the upstream cut-off valve 61 and the downstream cut-off valve 62 and the pressure of the outside air, is less than a reference pressure difference α for opening the downstream cut-off valve 62 (i.e., No in step S140). That is, the state of discharge of the impurities in the discharge pipe 50 is detected according to the pressure difference (P1−P2). When this pressure difference (P1−P2) is high, impurities flow out forcefully from the discharge pipe 50 to the outside, so efficient discharge of the impurities can be expected. On the other hand, as the pressure difference (P1−P2) drops, the flow of impurities from the discharge pipe 50 to the outside weakens, such that efficient discharge of impurities from the discharge pipe 50 to the outside can no longer be expected.

Thus, in this exemplary embodiment, the pressure difference at which impurities can no longer be expected to be efficiently discharged from the discharge pipe 50 to the outside is made the reference pressure difference cc for opening the downstream cut-off valve 62. The timing at which it is suitable for the downstream cut-off valve 62 to close is determined using the pressure difference (P1−P2).

When P1−P2<α (i.e., Yes in step S140), the control circuit 60 sends out both a command to close the downstream cut-off valve 62 (i.e., step S150) and a command to open the upstream cut-off valve 61 (i.e., step S160), after which this cycle of the routine ends. The upstream cut-off valve 61 may be opened either at the same time that the downstream cut-off valve 62 is closed, or after the downstream cut-off valve 62 is completely closed.

When P1−P2<α, the inside of the discharge pipe 50 is in a state such as that shown in FIG. 5, for example. That is, impurities IM that have accumulated in the discharge pipe 50 are discharged out of the fuel cell system 10, thereby reducing the impurity concentration in the discharge pipe 50.

The hydrogen concentration and the impurity concentration in the discharge pipe 50 in this exemplary embodiment fluctuate as shown in FIG. 6, for example. As shown in the drawing, the reference pressure difference α for opening the downstream cut-off valve 62 is not always uniquely related to the impurity concentration or the hydrogen concentration in the discharge pipe 50, but a reference value Dhrefs for closing the downstream cut-off valve 62, in FIG. 6, substantially corresponds to the impurity concentration (i.e., the hydrogen concentration) in the discharge pipe 50 when the pressure difference (P1−P2) is equal to a reference pressure difference α for closing the downstream cut-off valve 62. Also, the impurity concentration and the hydrogen concentration in the discharge pipe 50 changes depending on whether the downstream cut-off valve 62 is open or closed.

That is, when the fuel cell 20 starts to be operated, the discharge pipe 50 is full of hydrogen. As time passes when the fuel cell is operating, the concentration of impurities IM in the discharge pipe 50, which acts as a buffer, increases (i.e., the hydrogen concentration decreases). When the hydrogen concentration Dh is less than the reference concentration Dhrefo for opening the downstream cut-off valve 62, the upstream cut-off valve 61 is closed and the downstream cut-off valve 62 is opened such that the impurities IM in the discharge pipe 50 are discharged from the discharge pipe 50 to the outside by the concentration gradient and the pressure difference between the pressure in the discharge pipe 50 and the pressure of the outside air. As a result, the impurity concentration in the discharge pipe 50 can be restored to the level that it was at the beginning of operation of the fuel cell 20.

As described above, the fuel cell system 10 according to this exemplary embodiment includes the upstream cut-off valve 61 and the downstream cut-off valve 62 in the discharge pipe 50 that is connected to the fuel gas discharge portion 212 of the fuel cell 20. The control circuit 60 controls the opening and closing timings of these cut-off valves 61 and 62 using both the hydrogen concentration or the impurity concentration in the discharge pipe 50 between those cut-off valves 61 and 62, and the pressure difference between the pressure in the discharge pipe 50 between the cut-off valves 61 and 62 and the pressure of the outside air. Therefore, in the fuel cell system 10, impurities IM near the end region DS of the fuel cell 20 are led to the discharge pipe 50 by diffusion due to concentration difference and thus removed from the fuel cell 20 (i.e., the fuel gas flow path 21). As a result, it is possible to prevent a decline in the diffusivity of the fuel gas in the fuel gas flow path 21 which is caused by impurities. Moreover, it is possible to prevent the anode electrode from being covered by accumulating impurities. Thus, it is possible to always maintain the output voltage of the fuel cell 20 at a substantially constant value, without it being affected by the impurities, and therefore output a more stable output voltage. Furthermore, the power generating efficiency of each single cell in the end region DS of the fuel cell 20 can be further increased and the fuel cell 20 can supply power that is even more stable.

Also in this exemplary embodiment, when the downstream cut-off valve 62 is open, the upstream cut-off valve 61 is closed. Therefore, when impurities in the discharge pipe 50 are discharged, no hydrogen in the fuel cell 20 is discharged along with those impurities. That is, the control circuit 60 controls the downstream cut-off valve 62 and the upstream cut-off valve 61 open and closed so that they are both not fully open at the same time. As a result, the amount of hydrogen discharged from the fuel cell 20 can be reduced, thereby enabling the operating efficiency of the fuel cell to be improved.

Figure 7:
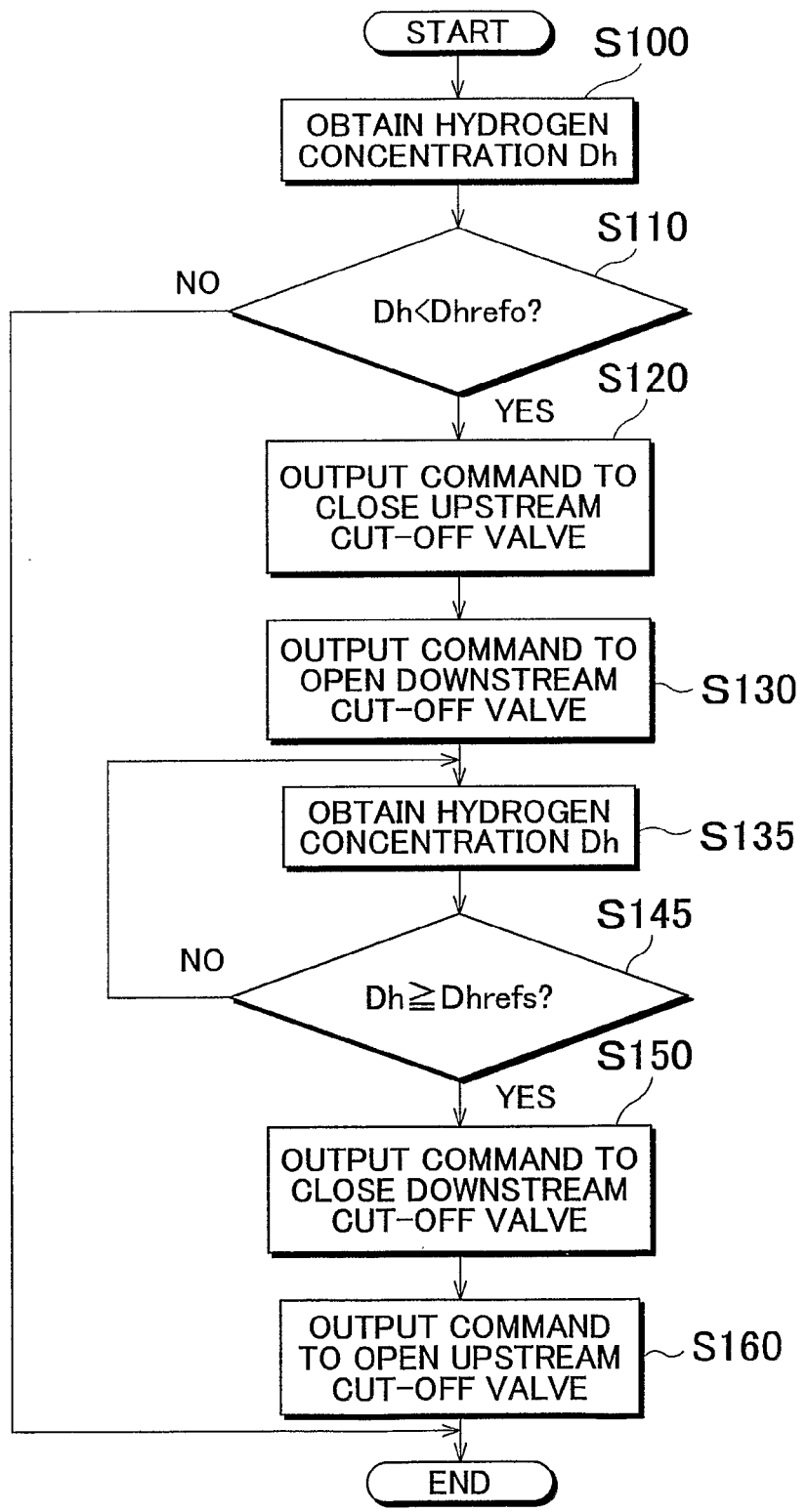
FIG. 7 is a flowchart illustrating a routine for an anode exhaust gas discharge process in a fuel cell according to another exemplary embodiment of the invention.

Other Exemplary Embodiments (1) In the foregoing exemplary embodiment, the state of discharge of the impurities within the discharge pipe 50 is detected using the pressure difference (P1−P2) between the pressure in the discharge pipe 50 between the upstream cut-off valve 61 and the downstream cut-off valve 62 and the pressure of the outside air. Alternatively, however, the impurity concentration or the hydrogen concentration in the discharge pipe 50 may be used instead of the pressure difference. This exemplary embodiment will be described with reference to FIG. 7. FIG. 7 is a flowchart illustrating a routine for an anode exhaust gas discharge process in a fuel cell according to another exemplary embodiment of the invention. Steps in this exemplary embodiment that have already been described in the foregoing exemplary embodiment will be denoted by the same step numbers used in the foregoing exemplary embodiment and detailed descriptions of those steps will be omitted. The following description will focus on the characteristic steps of this exemplary embodiment.

In this exemplary embodiment, the control circuit 60 determines, in step S110, whether the hydrogen concentration Dh within the discharge pipe 50 is less than the reference concentration Dhrefo for opening the downstream cut-off valve 62. If the hydrogen concentration Dh is less than the reference concentration Dhrefo, the control circuit 60 sends both a command to close the upstream cut-off valve 61 (i.e., step S120) and a command to open the downstream cut-off valve 62 (i.e., step S130).

The control circuit 60 obtains the hydrogen concentration Dh until the hydrogen concentration Dh in the discharge pipe 50 becomes equal to, or greater than, the reference concentration Dhrefs for closing the downstream cut-off valve 62 (i.e., steps S135 and S145). When it is detected that the hydrogen concentration Dh is equal to, or greater than, the reference concentration Dhrefs, the control circuit 60 sends out both a command to close the downstream cut-off valve 62 (i.e., step S150) and a command to open the upstream cut-off valve 61 (i.e., step S160). In the example shown in FIG. 6, the downstream cut-off valve 62 closes when the hydrogen concentration Dh in the discharge pipe 50 becomes equal to the reference concentration Dhrefs for closing the downstream cut-off valve 62. Alternatively, however, the downstream cut-off valve 62 may close after the hydrogen concentration Dh in the discharge pipe 50 has exceeded the reference concentration Dhrefs for closing the downstream cut-off valve 62.

This exemplary embodiment enables closing and opening control of the upstream cut-off valve 61 and the downstream cut-off valve 62 to be executed using only the hydrogen concentration or the impurity concentration within the discharge pipe 50. The reference concentration Dhrefs may be regarded as a first predetermined concentration of the invention, and the reference concentration Dhrefo may be regarded as a second predetermined concentration of the invention. Further, the reference concentration Dhrefo is a lower concentration than the reference concentration Dhrefs, and the concentration that causes the downstream cut-off valve 62 to open is a different concentration than the concentration that causes the downstream cut-off valve 62 to close.

(2) The foregoing exemplary embodiment was described using the fuel cell system 10 provided with two cut-off valves, i.e., the downstream cut-off valve 62 and the upstream cut-off valve 61. Alternatively, however, any number, i.e., one or a multiple number, of cut-off valves may be provided. In the case where a multiple number of cut-off valves are provided, the downstream cut-off valve 62 in the foregoing exemplary embodiment is the downstream-most cut-off valve and the upstream cut-off valve 61 is any cut-off valve other than the downstream-most cut-off valve. The same effects and advantages obtained in the foregoing exemplary embodiment can be obtained when the downstream-most cut-off valve is open and any cut-off valve, other than the downstream-most cut-off valve, is closed.

(3) In the foregoing exemplary embodiment, the impurity concentration is obtained by detecting the hydrogen concentration using the hydrogen concentration sensor 63. Alternatively, however, a correlative relationship between the output voltage of the fuel cell 20 and the impurity concentration in the fuel cell 20 may be obtained in advance and the impurity concentration may be detected based on the output voltage obtained from a voltage sensor that detects the output voltage of the fuel cell 20. Also in the foregoing exemplary embodiment, the flow rate (i.e., the discharge rate) of the anode exhaust gas in the discharge pipe 50 is sensed according to the pressure difference between the pressure in the discharge pipe 50 between the upstream cut-off valve 61 and the downstream cut-off valve 62 and the pressure of the outside air. Alternatively, however, the flow rate may be sensed using a flowmeter.

(4) In the foregoing exemplary embodiment, the fuel cell 20 has a polymer electrolyte membrane. Alternatively, however, the fuel cell 20 may have either a metal or nonmetal hydrogen separation membrane provided on an electrolyte membrane. For example, when the pressure resistance of the fuel cell 20 is determined by the separation membrane and a separation membrane is used that is extremely strong mechanically, the impurity concentration can be reduced relatively by increasing the hydrogen pressure supplied to the anode so as to increase the amount of hydrogen when output of the fuel cell drops. As a result, the number of times the cut-off valve 62 is opened can be reduced.

(5) In the foregoing exemplary embodiment, the fuel cell described is one in which single cells are stacked together, but the invention can also be applied to a single cell fuel cell.

(6) The foregoing exemplary embodiment does not describe in detail the manner in which the oxidizing gas is supplied, but it can be supplied by an external air pump, for example.

While fuel cell system of the invention has been described with reference to exemplary embodiments thereof, it is to be understood that those exemplary embodiments are intended to facilitate understanding of the invention and the invention is not limited to the exemplary embodiments or constructions. To the contrary, the invention is intended to cover various modifications and equivalent arrangements, the scope of the invention being indicated by the appended claims rather than by the foregoing description, and all changes and modifications which come within the meaning and range of equivalency of the claims are therefore intended to be embraced therein.

The invention claimed is:

1. A fuel cell system comprising:
    a fuel cell having an anode exhaust gas outlet for discharging anode exhaust gas, the fuel cell being configured to receive fuel gas;
    an anode exhaust gas discharge pipe which is connected to the anode exhaust gas outlet of the fuel cell and is configured to accumulate impurities contained in the anode exhaust gas of the fuel;
    a plurality of open/close mechanisms arranged in the anode exhaust gas discharge pipe, which can switch between open and closed;
    a control portion configured to (1) close a downstream-most open/close mechanism that is disposed farthest downstream, from among the plurality of open/close mechanisms, during normal operation of the fuel cell, and (2) close at least one open/close mechanism other than the downstream-most open/close mechanism, from among the plurality of open/close mechanisms, and open the downstream-most open/close mechanism, during a discharge operation of the fuel cell, so as to discharge the impurities that have accumulated in the anode exhaust gas discharge pipe together with the anode exhaust gas outside the fuel cell system; and
    a concentration detector which detects an impurity concentration in the anode exhaust gas discharge pipe upstream of the downstream-most open/close mechanism,
    wherein the control portion is configured to open the downstream-most open/close mechanism even if the fuel cell is operating normally when the impurity concentration detected by the concentration detector is higher than a first predetermined concentration.

2. The fuel cell system according to claim 1, wherein the concentration detector is configured to detect the impurity concentration between the downstream-most open/close mechanism and an open/close mechanism that is closed when the downstream-most open/close mechanism is open.

3. The fuel cell system according to claim 1, wherein the control portion is configured to close the downstream-most open/close mechanism when the impurity concentration that has become higher than the first predetermined concentration becomes lower than a second predetermined concentration.

4. The fuel cell system according to claim 3, wherein the control portion is configured to open at least one open/close mechanism other than the downstream-most open/close mechanism, from among the plurality of open/close mechanisms, when the downstream-most open/close mechanism is closed, based on the fact that the impurity concentration that has become higher than the first predetermined concentration has become lower than the second predetermined concentration.

5. The fuel cell system according to claim 1, wherein the concentration detector is configured to detect a hydrogen concentration in the anode exhaust gas discharge pipe upstream of the downstream-most open/close mechanism, and is configured to detect the impurity concentration from the detected hydrogen concentration.

6. The fuel cell system according to claim 1, wherein the concentration detector is configured to detect an output voltage of the fuel cell, and is configured to detect the impurity concentration from the detected output voltage.

7. The fuel cell system according to claim 1, further comprising:
    flow rate detecting means for detecting a flow rate of anode exhaust gas flowing through the anode exhaust gas discharge pipe downstream of the downstream-most open/close mechanism,
    wherein the control portion is configured to close the downstream-most open/close mechanism when the detected anode exhaust gas flow rate is less than a predetermined flow rate when the downstream-most open/close mechanism is open.

8. The fuel cell system according to claim 7, wherein the flow rate detecting means comprises a first pressure detector which is provided in the anode exhaust gas discharge pipe upstream of the downstream-most open/close mechanism and is configured to detect a pressure of the anode exhaust gas, and a second pressure detector which is provided in the anode exhaust gas discharge pipe downstream of the downstream-most open/close mechanism and is configured to detect the pressure of the anode exhaust gas, and wherein, when a pressure difference between the pressure of the anode exhaust gas detected by the first pressure detector and the pressure of the anode exhaust gas detected by the second pressure detector is equal to, or less than, a predetermined pressure when the detected impurity concentration is higher than the first predetermined concentration and the downstream-most open/close mechanism is open, the control portion is configured to determine that the detected anode exhaust gas flow rate is less than a predetermined flow rate and close the downstream-most open/close mechanism.

9. The fuel cell system according to claim 8, wherein when the pressure difference is less than a predetermined value, the control portion is configured to determine that the detected anode exhaust gas flow rate is less than the predetermined flow rate and close the downstream-most open/close mechanism.

10. The fuel cell system according to claim 7, wherein the control portion is configured to open at least one open/close mechanism other than the downstream-most open/close mechanism, from among the plurality of open/close mechanisms, when the downstream-most open/close mechanism is closed, based on the fact that the detected anode exhaust gas flow rate has become less than the predetermined flow rate.

11. The fuel cell system according to claim 1, wherein the plurality of open/close mechanisms are two open/close mechanisms, one being the downstream-most open/close mechanism and one being an upstream open/close mechanism that is disposed upstream of the downstream-most open/close mechanism.

12. The fuel cell system according to claim 1, wherein the plurality of open/close mechanisms are valves.

13. The fuel cell system according to claim 1, further comprising:
 a fuel gas supply portion that supplies fuel gas at a constant pressure to the fuel cell.

\* \* \* \* \*